United States Patent [19]

Reece

[11] 4,317,004
[45] Feb. 23, 1982

[54] IMAGING AND SCANNING SYSTEM

[75] Inventor: John W. Reece, Ithaca, N.Y.

[73] Assignee: NCR Corporation, Dayton, Ohio

[21] Appl. No.: 108,878

[22] Filed: Dec. 31, 1979

[51] Int. Cl.³ .................. G09F 9/34; H04L 23/00; H04N 1/06
[52] U.S. Cl. ................................ 178/15; 358/901
[58] Field of Search ............... 178/15, 30; 358/901; 340/334, 336; 350/96, 189

[56] References Cited

U.S. PATENT DOCUMENTS

| | | | |
|---|---|---|---|
| 3,359,366 | 12/1967 | Magleby | 178/30 |
| 3,458,655 | 7/1969 | Thourson | 178/30 |
| 3,619,484 | 11/1971 | Tanaka et al. | 358/901 |
| 3,644,922 | 2/1972 | James et al. | 178/30 |
| 4,133,600 | 1/1979 | Russell et al. | 178/15 |

OTHER PUBLICATIONS

"Development of a High-Speed Facsimile", Kobayashi et al. *Review of the Electrical Communication Laboratories,* vol. 23 Numbers 5-6, May-Jun. 1975, cover sheet and pp. 469-489.

*Primary Examiner*—Thomas A. Robinson
*Attorney, Agent, or Firm*—J. T. Cavender; Wilbert Hawk, Jr.; George J. Muckenthaler

[57] ABSTRACT

A sheet of optical fibers, circular at one end thereof and unfurled at the other end to form a straight line, is used to transmit laser-emitted light through a rotating prism and onto a photosensitive surface for electrophotographic printing or copying.

5 Claims, 4 Drawing Figures

IMAGING AND SCANNING SYSTEM

BACKGROUND OF THE INVENTION

In the area of optical scanning of data or like information, it is recognized that with the advent of higher-speed operations, there exists a need for printers that print such data or information at a rate which reasonably adapts to the specific operation.

One of the means for advancing such data or information to the point of providing high-speed transmission thereof is the use of a laser device as the light source. The laser beam may be directed to and through a multi-sided mirror or like prism which is rotatable to cause the beam to sweep along a line of printing. The rotating mirror system of the multi-sided type has difficult requirements to maintain—such as mirror symmetry, the position and speed control, and the need to be extremely precise in manufacture of the components and the assembly thereof, all of which may lead to a very expensive system.

The laser beam is utilized with fiber optic systems by reason that the optic links require light sources that can be rapidly turned on and off and also have good linearity. While the practice of the laser beam and fiber optics in the art of imaging may not be adaptable for long-distance generation, it is becoming useful for rapid transmission of data through use of a communications link or data stored by way of magnetic recording.

Representative prior art in the use of fiber optics in U.S. Pat. No. 3,403,263, issued to C. W. Hargens on Sept. 24, 1968, which discloses a method and apparatus for optical fiber curve follower and for making position scale therefor. A plurality of transducer devices employ the ends of optical fibers in a close-spaced relationship for the purpose of either sensing light from a surface or for optically creating a pattern on a surface.

U.S. Pat. No. 3,538,312, issued to R. Genahr on Nov. 3, 1970, discloses an orthogonal fiber-optical scanner using bundles of optical fibers associated with a fixed disc wherein fibers from successive rows occupy successive arcs along the circle of the disc, input ends of fibers are constantly illuminated by a light source, and a motor drives a rotatable arm to scan an array of n columns and m rows.

U.S. Pat. No. 3,832,488, issued to W. D. Fahey et al. on Aug. 27, 1974, shows a computer output microfilm non-impact printer which uses light-emitting diodes and flexible optic light guides to generate images to be printed on light-sensitive film. The linear array of light guide ends is imaged on the film by means of a lens and, by selective energization of the diodes, a complete line of characters is printed in linear segments in a line scan mode, by discrete points of light impinging on the film surface.

SUMMARY OF THE INVENTION

The present invention relates to an imaging and scanning system and more particularly, to utilization of fiber optics for conveying a pulsed or modulated laser beam as a source of light onto a sensitized surface for electrophotographic printing or copying. The system is appropriate for printing images or characters by means of generating a row of dots at a time with each revolution of a rotating member. The laser beam is deflected by a first mirror or prism surface onto a second mirror or prism surface which is disposed radially from the first surface and then is directed into the end face of a fiber optic sheet arrayed in a circle so as to align the fibers with the optical path. The optical path is caused to be radially displaced by the rotating member to direct the laser beam into the ends of the fibers arrayed in the circle. The fibers conduct the light as received and project the light onto the sensitized surface with the fiber optic sheet being unfurled from the circle and extending along a line on the surface to be scanned. The sensitized surface is translated laterally at a rate to provide correct spacing of the lines of a raster or like pattern that is formed during the imaging and scanning operation.

In view of the above discussion, the principal object of the present invention is to provide an imaging and scanning system that utilizes fiber optics to project laser beams onto a surface.

An additional object of the present invention is to provide an imaging and scanning system which reduces the precision level required of the components and their assembly.

Another object of the present invention is to provide an imaging and scanning system wherein a rotating prism enables better speed control and synchronization of the several parts in the operation of the apparatus.

A further object of the present invention is to provide an imaging and scanning system wherein the linear relation between the rotation angle and dot spacing reduces or eliminates distortion effects.

Additional advantages and features of the present invention will become apparent and fully understood from a reading of the following specification taken together with the annexed drawing.

DESCRIPTION OF THE PREFERRED EMBODIMENT

Figure 1:
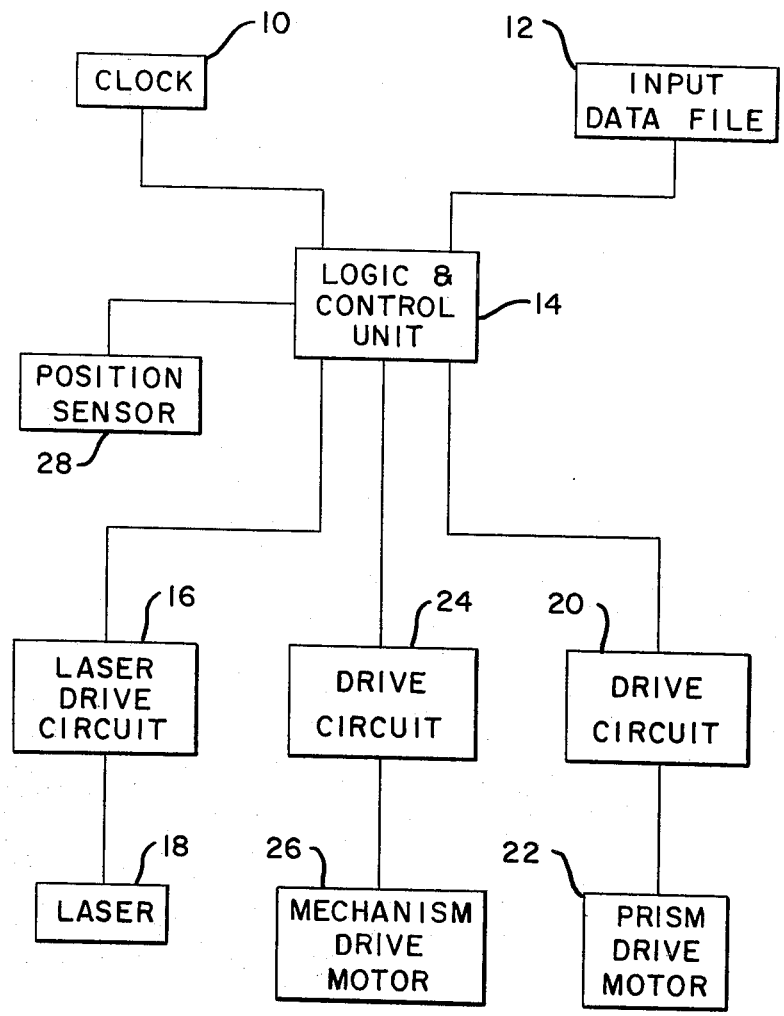
FIG. 1 is a block diagram of the essential components of an imaging and scanning system of the present invention.

Prior to discussing the several Figures of the drawing, it is convenient to mention the several components utilized in and the arrangement of such components for carrying out the present invention. The apparatus enables the projection of light points in a linear array for the purpose of generating an image on record media of stored, input or received data or information. Essentially, the purpose is to array the fiber optic ends along a single line scanning one line of dots at a time and then advancing the record media by one dot row for each dot line. The pulsed or modulated laser beam is conveyed through the optical fibers onto the sensitized surface for electrophotographic printing or copying. The electrophotographic process enables the forming of images by various electrical and photographic means and the process may include the use of a selenium coated drum or a photosensitized belt to transfer images to paper, or to form images directly on photosensitive paper such as zinc oxide coated paper. The sensitized surface is of course adapted for receiving a raster or predetermined pattern of scanning lines which provide substantial uniform coverage of the areas.

Referring to the drawing, FIG. 1 shows, in a preferred embodiment, a block diagram of the essential components or elements and the major flow paths interconnecting such components of the present invention. The system functions from digital input data which is suitably buffered or temporarily stored in the transfer process. The system is keyed to the pulse rate of a clock 10 which is synchronized with the release of data from a data input file 12 and communicated to a logic and control unit 14. The pulse rate from the clock 10 also is connected through the logic and control unit 14 to a laser drive circuit 16 for a laser 18 so as to synchronize the release of the input data and the laser drive. The clock rate or a sub-multiple of such rate establishes the stepping rate or a precise rotational speed through a drive circuit 20 for a prism or head drive motor 22. The logic and control unit 14 also is connected through a drive circuit 24 for a mechanism drive motor 26. The mechanism drive motor 26 drives a roller or drum 52 (FIG. 2) and feeds paper 54 in a synchronous operation wherein the paper 54 is pushed or driven in a manner so that the paper and the roller 52 operate together on the surface 50 of the roller. A position sensor 28 is connected to trigger release of input data to coincide with a precise point relative to the array of optical fibers. The various flow paths indicate conveyance of electrical signals for control or data feed, or electrical power for device actuation.

Figure 2:
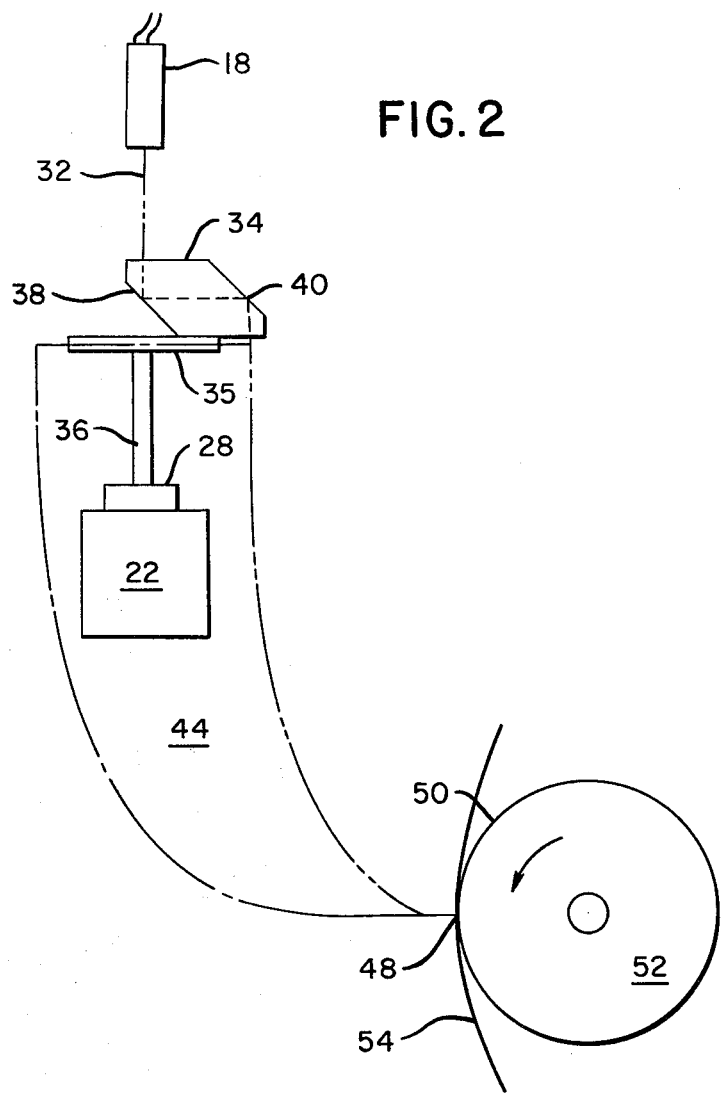
FIG. 2 is a diagrammatic view of the arrangement of the parts of the present system.

FIG. 2 shows a diagrammatic view of the arrangement of the components of the present invention and includes a light source in the nature of the laser 18 which is pulsed or modulated according to an assigned function to project a light beam or ray 32 toward and through a prism 34 carried on a rotatable member 35 and driven in rotational manner by the motor 22 through a shaft 36. The laser beam 32 is directed toward a first face 38 (FIG. 3) of the prism 34, then deflected or dispersed onto a second face 40 of the prism 34 and then directed toward the end face 42 (FIG. 3) of a fiber optic sheet 44. It is of course obvious that the prism 34 may also comprise a suitable mirror arrangement providing for the beam 32 direction control as above described.

Figure 3:
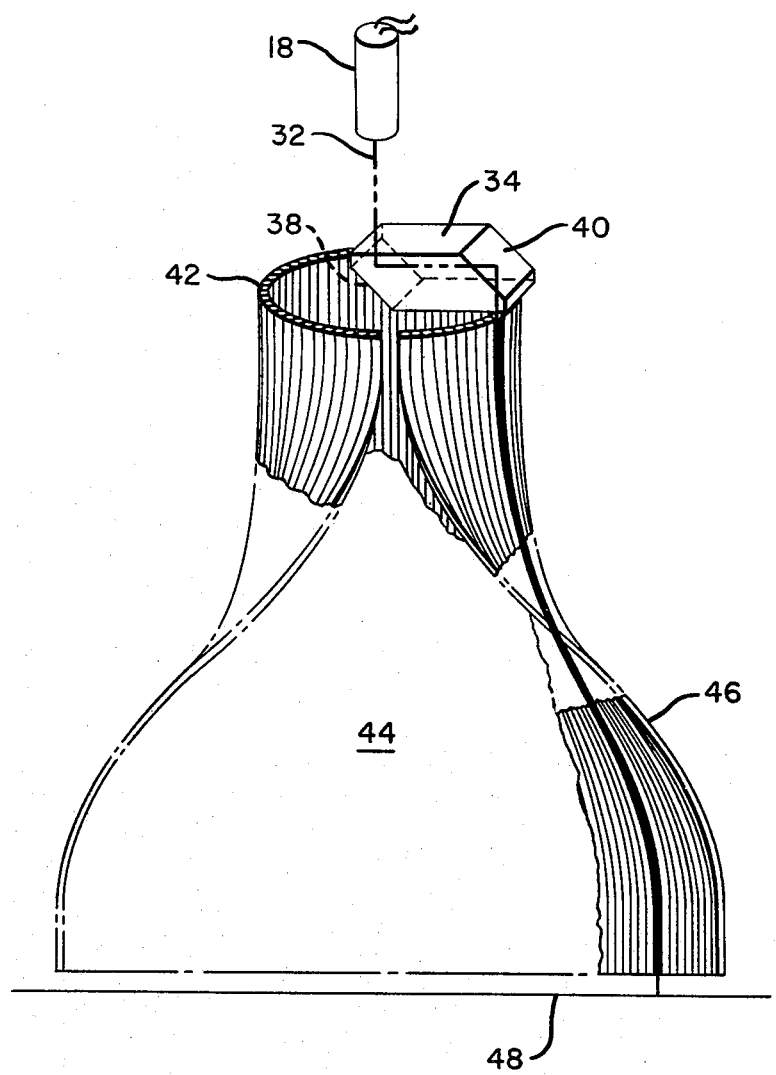
FIG. 3 is an enlarged view of the light source along with the prism and the sheet of optical fibers.

As better seen in FIG. 3, the rotating prism 34 occupies an area from the center of a circle to the circumference of a formation of the optical fiber sheet 44 wherein the pulsed beam 32 is directed into the ends 42 of the optical fibers 46 making up the sheet 44. The fibers 46 conduct the light beam 32 in a path which is formed by the unfurling of the sheet 44 to a line position 48 so as to form a raster on the photosensitive paper 54 held under tension and driven by the roller 52.

The position sensor 28 (FIGS. 1 and 2), which informs the logic and control unit 14 of the rotational position of the prism 34 at all times, may be a fast response light emitting diode/phototransistor pair communicating through a slot in a rotating disk or communicating in interruptive manner by a flag mounted on the shaft 36. The position sensor 28 provides an indication of prism 34 position and synchronizes the light pulses or beams 32 with the ends 42 of the fibers 46.

Figure 4:
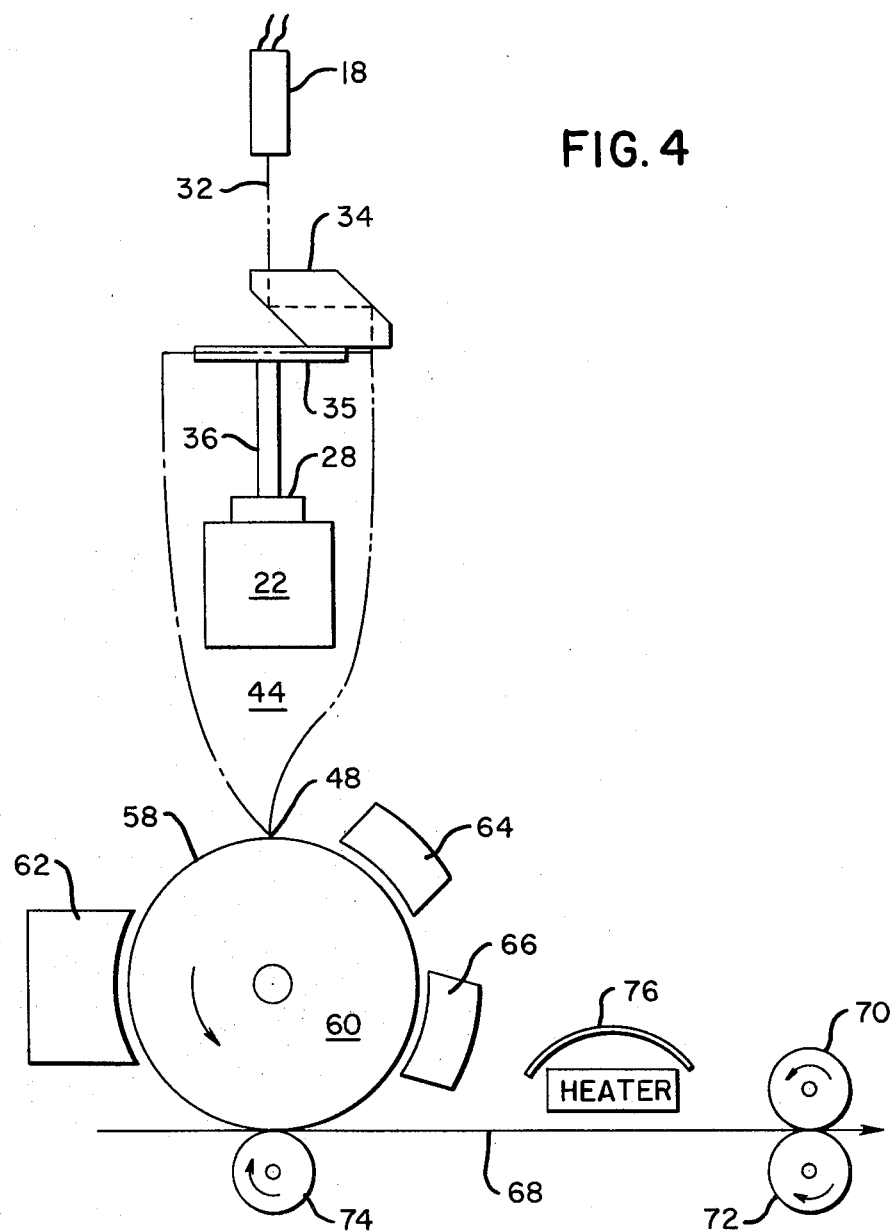
FIG. 4 is a diagrammatic view of a modification showing a toner transfer type printing system.

FIG. 4 shows a modification of an arrangement of parts for a toner transfer type printing system wherein the laser 18 projects the beam 32 toward and through the prism 34 carried on the rotatable member 35 and driven in the same manner by the motor 22 through the shaft 36, as seen in FIG. 2. The fiber optic sheet 44 is unfurled to direct the laser beam 32 to the line position 48 so as to form a raster on the surface 58 of a selenium coated drum 60. The toner transfer type system includes a toning unit 62, a charge station 64 and a cleaner station 66 adjacent the drum 60. Either ordinary or glue-coated paper 68 is caused to be driven by feed rolls 70 and 72 for transporting the paper past a toner transfer station 74 and a fixing station 76. The receiving surface may be any photoreceptor type applicable with variations of the presently described system which may include a photosensitive belt, photosensitive paper and charge transfer versus toner transfer systems.

In the operation of the mechanism, the prism 34 is rotated by the motor 22 at a high speed and the fiber optic sheet 44 readily receives the modulated light beam 32 and directs the light rays through the fibers 46 and onto the paper 54 on the surface 50 and along a line position 48 of the roller 52 or on the surface 58 of the drum 60 and onto the paper 68. One rotation of the prism 34 scans one dot row or line on the paper 54 carried on the surface 50 of the roller 52. As mentioned above, the pulse rate from the clock 10 synchronizes the input of data from the input data file 12 through the logic and control unit 14 with the laser drive circuit 16 and with the prism motor drive circuit 20. The prism or head drive motor 22 may be a stepper motor with appropriate stepping control or a synchronous motor operating at a precise rotational speed.

It is thus seen that herein shown and described is an imaging and scanning system which includes mechanism utilizing a laser beam and a rotating prism along with a sheet of optical fibers for directing light rays onto a sensitive surface for imaging a line of dots for each rotation of the prism. The mechanism enables the accomplishment of the objects and advantages mentioned above, and while a preferred embodiment of the invention has been disclosed herein, variations thereof may occur to those skilled in the art. The drum 52 may be a selenium metal type which retains a charge that attracts the toner in the imaging process, or the drum may be replaced by a sensitized belt which may be a plastic belt having a chemical treatment and made up of aluminum foil with a cadmium sulfide coating and a polyester film in laminate form. Additionally, the paper 54 used in the electrographic process is of the type used in such process which includes image transfer, toner application, and a baking operation to fix the image. It is contemplated that all variations and modifications not departing from the spirit and scope of the invention hereof are to be construed in accordance with the following claims.

I claim:

1. An imaging system for recording input information on a photosensitive record medium, comprising a
   laser light source,
   light guide means comprising a sheet of optical fibers having a predetermined length and arranged in a circle at one end thereof adjacent said light source and unfurled to form a straight line at the other end thereof,
   means for sensing a selected one of said optical fibers at said one end thereof for coinciding with and initiating flow of input information to be recorded,
   deflective prism means receiving a beam of light in a line from said light source and for directing said light in a radial direction to said one end of said light guide means, means for driving said deflective prism means in a rotary direction to direct said light in said circle of light guide means, and means for synchronizing the flow of input information to be recorded with the beam of light emitted from said laser light source and with said means for driving said deflective prism means for generating a row of dots along said line corresponding to input information transmitted during one revolution of said prism means.

2. The system of claim 1 including means connected with said synchronizing means for advancing said record medium a line position after driving said deflective prism means in one revolution.

3. Apparatus for printing images of input data by generating a row of dots at a time along a line of printing on a record medium, comprising a regulated laser light source emitting a beam of light, a plurality of adjacent light guides comprising optical fibers formed in a circle at one end thereof and unfurled to form a straight line along said line of printing at the other end thereof, prism dispersing means positioned to receive and to direct said beam of light along said circle, means for sensing a selected one of said optical fiber light guides at said one end thereof for coinciding with and initiating flow of input data to be printed, means for driving said dispersing means in a rotating direction to direct said beam of light in said circle of the optical fiber light guides, and means for controlling input data to be printed along with the beam of light from said regulated laser light source and with said means for driving said prism dispersing means for generating said row of dots on said record medium corresponding to input data transmitted during one revolution of said dispersing means.

4. The apparatus of claim 3 including means connected with said controlling means for advancing said record medium a line position after driving said dispersing prism means in one revolution.

5. A method of recording input information along a line on a record medium comprising the steps of:

providing means for guiding light from a circular array to said line on the record medium, directing a modulated beam of light at the center of said circular array, receiving the beam of light at said center of said circular array, deflecting said beam of light from the center of said circular array to the circumference thereof, directing said beam to and through said light guiding means to said line, synchronizing the input information to be recorded with the modulated beam of light deflected from the center of said circular array and directed through said light guiding means so as to record a line of input information corresponding to that transmitted during the directing of said beam of light around said circular array, and advancing said record medium a line position after recording said input information along a line thereof.

* * * * *